United States Patent
Butcher et al.

(10) Patent No.: US 7,802,080 B2
(45) Date of Patent: Sep. 21, 2010

(54) NULL EXCEPTION HANDLING

(75) Inventors: David John Butcher, Kings' Lynn (GB); Stephen John Hill, Austin, TX (US); Hedley James Francis, Newmarket (GB); Vladimir Vasekin, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 1434 days.

(21) Appl. No.: 10/807,498

(22) Filed: Mar. 24, 2004

(65) Prior Publication Data

US 2005/0216711 A1    Sep. 29, 2005

(51) Int. Cl.
G06F 9/40 (2006.01)
G06F 9/44 (2006.01)
G06F 9/445 (2006.01)

(52) U.S. Cl. .................. 712/233; 712/208; 712/211; 712/234; 712/244

(58) Field of Classification Search ............... 712/208, 712/211, 233, 234, 244
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A | 5/1990 | Holloway et al. | |
| 4,969,091 A | 11/1990 | Muller | |
| 5,136,696 A | 8/1992 | Beckwith et al. | |
| 5,430,862 A * | 7/1995 | Smith et al. ................ | 703/26 |
| 5,455,775 A | 10/1995 | Huber et al. | |
| 5,590,294 A * | 12/1996 | Mirapuri et al. ............. | 712/244 |
| 5,619,665 A | 4/1997 | Emma | |
| 5,638,525 A | 6/1997 | Hammond et al. | |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,784,584 A | 7/1998 | Moore et al. | |
| 5,809,336 A | 9/1998 | Moore et al. | |
| 5,838,948 A | 11/1998 | Bunza | |
| 5,875,336 A | 2/1999 | Dickol et al. | |
| 5,889,982 A * | 3/1999 | Rodgers et al. ............. | 712/229 |
| 5,892,966 A | 4/1999 | Petrick et al. | |
| 5,925,123 A | 7/1999 | Tremblay et al. | |
| 5,926,832 A | 7/1999 | Wing et al. | |
| 5,937,193 A | 8/1999 | Evoy | |
| 5,953,741 A | 9/1999 | Evoy et al. | |
| 6,003,126 A | 12/1999 | Huynh et al. | |
| 6,009,499 A | 12/1999 | Koppala | |
| 6,009,509 A | 12/1999 | Leung et al. | |

(Continued)

OTHER PUBLICATIONS

Tanenbaum, Andrew S. "Structured Computer Organization". Second Edition. Englewood Cliffs, New Jersey: Prentice-Hall, Inc. © 1984. pp. 10-12.*

(Continued)

Primary Examiner—Aimee J Li
(74) Attorney, Agent, or Firm—Nixon & Vanderhye P.C.

(57) ABSTRACT

A processor 6 is provided with an instruction decoder 18 which is responsive to memory access instructions to determine whether the base register value being used matches a null value and if such a match occurs then branches to a null value exception handler.

60 Claims, 5 Drawing Sheets

U.S. PATENT DOCUMENTS

| | | | |
|---|---|---|---|
| 6,014,723 | A | 1/2000 | Tremblay et al. |
| 6,021,469 | A | 2/2000 | Tremblay et al. |
| 6,026,485 | A | 2/2000 | O'Connor et al. |
| 6,031,992 | A | 2/2000 | Cmelik et al. |
| 6,038,643 | A | 3/2000 | Tremblay et al. |
| 6,070,173 | A | 5/2000 | Huber et al. |
| 6,088,786 | A | 7/2000 | Feierbach et al. |
| 6,122,638 | A | 9/2000 | Huber et al. |
| 6,125,439 | A | 9/2000 | Tremblay et al. |
| 6,148,391 | A | 11/2000 | Petrick |
| 6,298,434 | B1 | 10/2001 | Lindwer |
| 6,317,872 | B1 | 11/2001 | Gee et al. |
| 6,332,215 | B1 | 12/2001 | Patel et al. |
| 6,338,134 | B1 | 1/2002 | Leung et al. |
| 6,349,377 | B1 | 2/2002 | Lindwer |
| 6,363,522 | B1 * | 3/2002 | Click et al. ............... 717/160 |
| 6,374,286 | B1 | 4/2002 | Gee et al. |
| 6,484,314 | B1 * | 11/2002 | Ishizaki et al. ............ 717/151 |
| 6,606,743 | B1 | 8/2003 | Raz et al. |
| 6,789,098 | B1 * | 9/2004 | Dijkstra .................... 708/495 |
| 2004/0268095 | A1 * | 12/2004 | Shpeisman et al. ......... 712/225 |

OTHER PUBLICATIONS

H. Stone, Chapter 12—"A Pipeline Push-Down Stack Computer", 1969, pp. 235-249.
C. Glossner et al, "Delft-Java Link Translation Buffer", Aug. 1998.
N. Vijaykrishnan et al, "Object-Oriented Architectural Support For a Java Processor" 1998, pp. 330-355.
C. Glossner et al, "The Delft-Java Engine: An Introduction", Aug. 1997.
K. Ebcioglu et al, "A Java ILP-Machine Based on Fast Dynamic Compilation", Jan. 1997, pp. 1-13.
A. Wolfe, "First Java-specific chip takes wing" *EETimes*—1997.
Y. Patt, *Introduction to Computing Systems From Bits and Gates to C and Beyond*, 1999, pp. 1-517.
M. Ertl, "Stack Caching for Interpreters" 1994, pp. 1-10.
M. Ertl, "Stack Caching for Interpreters" 1995, pp. 1-13.
M. Ertl, "Implementation of Stack-Based Languages on Register Machines" Apr. 1996, pp. 1-4.
K. Andrews et al, "Migrating a CISC Computer Family Onto RISC Via Object Code Translation." 1992, pp. 213-222.
J. O'Connor et al,"PicoJava I Microprocessor Core Architecture" Oct. 1996, pp. 1-8, Sun Microsystems.
M. Ertl, "A New Approach to Forth Native Code Generation" 1992.
M. Maierhofer et al, "Optimizing Stack Code" 1997, p. 1-9.
D. Ungar et al, "Architecture of SOAR: Smalltalk on a RISC" The 11th Annual International Symposium on Computer Architecture, Jun. 1984, pp. 188-197.
O. Steinbusch, "Designing Hardware to Interpret Virtual Machine Instructions" Feb. 1998, pp. 1-59.
R. Kapoor et al, "Stack Renaming of the Java Virtual Machine" Dec. 1996, pp. 1-17.
A. Yonezawa et al, "Implementing Concurrent Object-Oriented Languages in Multicomputers" *Parallel and Distributed Technology* (*Systems and Applications*) May 1993, pp. 49-61.
C. Hsueh et al, "Java Bytecode to Native Code Translation; The Caffeine Prototype and Preliminary Results" IEEE/ACM International Symposium on Microarchitecture, Dec. 1996, pp. 90-97.
Y. Patt et al, *Introduction to Computing Systems From Bits and Gates to C and Beyond*, 2001, pp. 1-526.
Sun Microsystems PicoJava Processor Core Data Sheet, Dec. 1997, pp. 1-11.
H. McGhan et al, PicoJava A Direct Execution Engine for Java Bytecode, Oct. 1998, pp. 22-26.
C. Glossner et al, "Parallel Processing" Euro-Par 1997: Passau, Germany, Aug. 1997.
Y. Patt, *Introduction to Computing Systems From Bits and Gates to C and Beyond*, 1999, pp. 10-12 & 79-82.
Espresso—The High Performance Java Core Specification, Oct. 2001, pp. 1-33, Aurora VLSI, Inc.
J. Gosling, "Java Intermediate Bytecodes" 1995, pp. 111-118.
P. Koopman, Jr. "Stack Computers The New Wave" 1989, pp. 1-234.
J. O'Connor et al, "PicoJava-I: The Java Virtual Machine in Hardware" IEEE *Micro* A Case for Intelligent RAM, Mar./Apr. 1997, pp. 45-53.
M. Mrva et al, "A Scalable Architecture for Multi-Threaded JAVA Applications" Design Automation and Test in Europe, Feb. 1998, pp. 868-874.
L. Chang et al, "Stack Operations Folding in Java Processors" *IEEE Proc.—Comput. Digit. Tech.*, vol. 145, No. 5, pp. 333-340 Sep. 1998.
L. Ton et al, Proceedings of the '97 International Conference on Parallel and Distributed Systems, "Instruction Folding in Java Processor", pp. 138-143, Dec. 1997.
K. Buchenrieder et al, "Scalable Processor Architecture for Java With Explicit Thread Support" *Electronics Letters* vol. 33, No. 18, pp. 1532+, Aug. 1997.
C. Chung et al, Proceedings of the '98 International Conference on Parallel and Distributed Systems, "A Dual Threaded Java Processor for Java Multithreading" pp. 693-700, Dec. 1998.
I. Kazi et al, "Techniques for Obtaining High Performance in Java Programs" Sep. 2000, pp. 213-240.
R. Kieburtz, "A RISC Architecture for Symbolic Computation" 1987, pp. 146-155.
M. Berekovic et al, "Hardware Realization of a Java Virtual Machine for High Performance Multimedia Applications", pp. 479-488, 1997.
M. Ibrahim et al.; "Signal Processing Systems (*SIPS* 97) *Design and Implementation*"; 1997 IEEE Workshop, Nov. 1997.
P. Deutsch, "Efficient Implementation of the Smalltalk-80 System" 1983, pp. 297-302.
J. Davis; "Rockwell Produces Java Chip" Sep. 1997, CNET NEWS. COM, pp. 1 of 3.
Y. Patt et al, *Introduction to Computing Systems from Bits and Gates to C and Beyond*, 2001, pp. 1-16, 91-118 & 195-209.

* cited by examiner

| Instruction | LDR.X Rd, [R9, #immediate.6] | | | | | | | | | | | |
|---|---|---|---|---|---|---|---|---|---|---|---|---|
| Encoding | 15 | 14 | 13 | 12 | 11 | 10 | 9 | 8 | 3 | 2 | 0 |
| | < LDR.X op.code > | | | | | | | #immed_6 | | Rd | |
| Thumb-2 Equivalent | LDR Rd, [R9 + #immediate LSL #2] | | | | | | | | | | | |
| Definition | Rd = [R9 + #immediate LSL #2] | | | | | | | | | | | |
| Encoding space | 2^8 | | | | | | | 8 bits | | | | |
| Note | This instruction, as are all loads and stores while in Jazelle-X state, is subject to the Null Check mechanism described in 4.3 | | | | | | | | | | | |
| Instruction | STR.X Rd, [R9, #immediate.6] | | | | | | | | | | | |
| Encoding | 15 | 14 | 13 | 12 | 11 | 10 | 9 | 8 | 3 | 2 | 0 |
| | < STR.X op.code > | | | | | | | #immed_6 | | Rd | |
| Thumb-2 Equivalent | STR Rd, [R9 + #immediate LSL #2] | | | | | | | | | | | |
| Definition | [R9 + #immediate LSL #2] = Rd | | | | | | | | | | | |
| Encoding space | 2^8 | | | | | | | 8 bits | | | | |
| Note | This instruction, as are all loads and stores while in Jazelle-X state, is subject to the Null Check mechanism | | | | | | | | | | | |

Fig. 4

NULL EXCEPTION HANDLING

BACKGROUND OF THE INVENTION

1. Field of the Invention

This invention relates to the field of data processing systems. More particularly, this invention relates to the handling of exceptions due to program instructions making reference to null values.

2. Description of the Prior Art

It is known within data processing systems to provide mechanisms that check for memory accesses being made to memory locations specified by a null variable. When such conditions arise, processing is diverted to a null exception handler and appropriate corrective action taken before processing is restarted. Typically, these mechanisms are provided within a virtual machine software implementation with the null detection taking place in software.

In the case of the Jazelle Java hardware acceleration mechanisms produced by ARM Limited of Cambridge, England, a hardware block is provided which decodes Java bytecodes and generates control signals for use in controlling processing logic to perform desired processing operations. Such Jazelle hardware effectively provides native execution of Java bytecodes and as part of this the hardware makes a check for null values associated with Java bytecodes and generates an appropriate null value exception when these occur. This null value exception is then handled in software.

The hardware Jazelle approach suffers from the disadvantage that it is difficult to map some stack based programming languages into register file based processors in an efficient manner. This renders it desirable to use approaches such as just in time (JIT) compilation and dynamic adaptive translation. With these techniques, the non-native code is translated into native code which is then stored within memory and then subsequently executed. Whilst the approach of converting the non-native code into translated code and storing this in memory can result in more rapid execution once the translation has been made, it suffers from the disadvantage that a considerable amount of memory storage space is needed to store the translated program instruction stream. Measures which can reduce this storage space requirement are strongly advantageous.

SUMMARY OF THE INVENTION

Viewed from one aspect the present invention provides apparatus for processing data comprising:

processing logic operable to perform data processing operations; and an instruction decoder operable to decode program instructions to control said processing logic to perform data processing operations specified by said program instructions; wherein said instruction decoder is responsive to a memory access instruction:

(i) to compare a base register value stored within a base register specified by a base register field of said memory access instruction with a predetermined null value; and (ii) if said base register value matches said predetermined value, then to branch to execution of a null value exception handler.

The present technique recognises that the provision of program instructions to check for the occurrence of null values introduces a significant performance reduction and code size increase since it is typically required to be performed frequently within the translated code. Even with undesirably complex JIT compilers or dynamic adaptive translators, there is still a need for additional program instructions to perform the null checks despite the compiler or translator attempting to optimise these out of the case where possible. The present technique recognises these disadvantages and provides that memory access instructions are checked to determine if the base register value corresponds to a predetermined null value. Within the context of a system which is executing translated program instructions, the predetermined null value can readily be chosen as one which would not in the normal course of execution of that translated program occur. If a match is detected between a base register value and the null value, then a null value exception handler is invoked. Modifying the memory access instructions to perform, at least when operating within a mode which is executing a translated instruction stream, a null value check reduces or removes the need to insert additional program instructions to perform this null value check and so advantageously reduces the code size. The null checking is able to trap inappropriate null values which occur due to programming errors in the program code being translated as well as due to programming errors in the compilation or translation code itself.

It will be appreciated that the null value exception handler may be provided and may operate in many different ways. In one mechanism, the execution of the translated program may simply be stopped by the null value exception handler and an error reported. However, in preferred embodiments the memory access instruction serves to store a return address pointing to a memory location storing a program instruction to be executed upon return from the null value exception handler such that execution may be restarted when the null value handling has been completed. This return address pointer may resume execution at that specific point or merely at a point related to that specific point, such as restarting at a point prior to or subsequent to the execution point where the null value exception arose in a way that avoids a repeat of the exception.

The flexibility of the present technique is increased in embodiments in which the null value exception handler is located at a memory address pointed to by a value stored within a programmable configuration register. This programmable configuration register may advantageously be provided as a coprocessor configuration register since it will infrequently need changing and accordingly need not occupy one of the register within the main register file, which are typically a limiting resource.

The null value exception handling mechanism discussed herein may advantageously be provided in combination with other exception handling mechanisms which are accessed via a common pointer value and accordingly preferred embodiments serve to access the null value exception handler by referencing an instruction stored at a memory address given by the programmable configuration register subject to a fixed offset associated with the occurrence of the null value match.

The null value exception handler may deal with the null value exception in a variety of different ways as previously mentioned. In particular, preferred embodiments of the null value exception handler may differentiate between occurrences of null value exceptions which are the result of trying to emulate a non-native instruction which is seeking to make a null value reference due to a programming error in the emulated code as distinct from an error resulting from a bug within a compiler or translator used to form translated code.

It will be appreciated that the non-native program instructions could take a wide variety of different forms such as, for example, Java bytecodes, MSIL bytecodes, CIL bytecodes and .NET bytecodes. The non-native instructions may also be native program instructions of a different apparatus, such as a different processor core (e.g. seeking to emulate x86 instructions on a RISCARM core).

The pointer to the null value exception handler could point directly to the start of this exception handling code or alternatively may point to a jump instruction which then jumps to the start of that exception handling code.

It will be appreciated that the memory access instructions may, for example, be either load instructions or store instructions, either of which can give rise to null value exceptions.

Viewed from another aspect the present invention provides a method of processing data with an apparatus for processing data having processing logic operable to perform data processing operations and an instruction decoder operable to decode program instructions to control said processing logic to perform data processing operations specified by said program instructions, said method comprising the steps of:

in response to said memory access instruction decoded by said instruction decoder controlling said processing logic:

(i) to compare a base register value stored within a base register specified by a base register field of said memory access instruction with a predetermined null value; and (ii) if said base register value matches said predetermined value, then to branch to execution of a null value exception handler.

Viewed from a further aspect the present invention provides a computer program product including a computer program operable to control an apparatus for processing data having processing logic operable to perform data processing operations and an instruction decoder operable to decode program instructions to control said processing logic to perform data processing operations specified by said program instructions, said computer program comprising:

a memory access instruction decodable by said instruction decoder to control said processing logic:

(i) to compare a base register value stored within a base register specified by a base register field of said memory access instruction with a predetermined null value; and (ii) if said base register value matches said predetermined value, then to branch to execution of a null value exception handler.

Viewed from a further aspect the present invention provides a computer program product including a computer program operable to translate non-native program instructions to form native program instructions directly decodable by an apparatus for processing data having processing logic operable to perform data processing operations and an instruction decoder operable to decode program instructions to control said processing logic to perform data processing operations specified by said program instructions, said native program instructions comprising:

a memory access instruction decodable by said instruction decoder to control said processing logic:

(i) to compare a base register value stored within a base register specified by a base register field of said memory access instruction with a predetermined null value; and (ii) if said base register value matches said predetermined value, then to branch to execution of a null value exception handler.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically represents an instruction encoding for memory access instructions.

DESCRIPTION OF THE PREFERRED EMBODIMENTS

Figure 1:
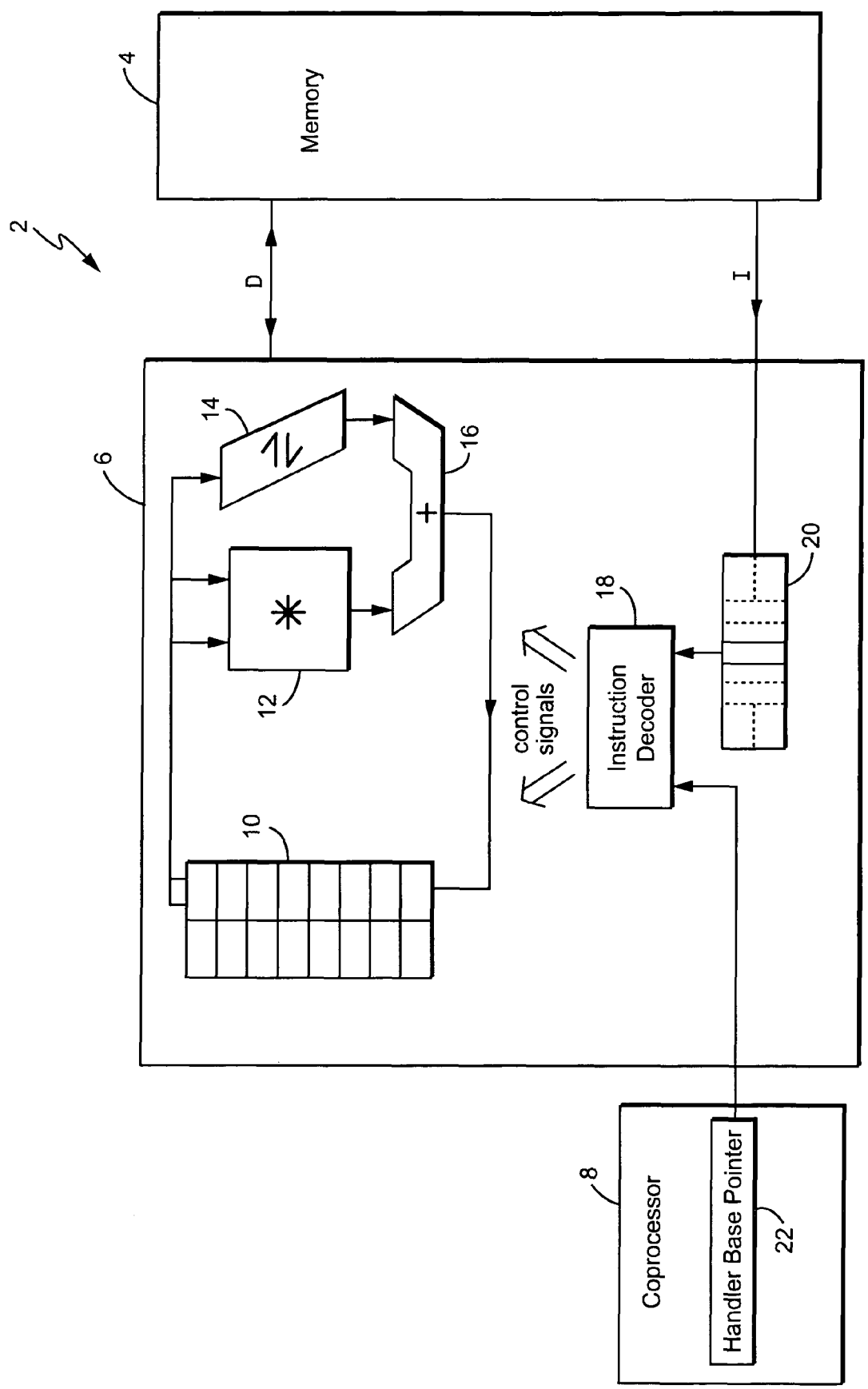
FIG. 1 schematically illustrates a data processing system which can be used to execute non-native program instructions.

FIG. 1 shows a data processing system 2 including a memory 4, a processor 6 and a configuration coprocessor 8. The memory 4 stores program instructions to be executed and data to be manipulated. The processor 6 includes processing logic including a register file 10, a multiplier 12, a shifter 14 and an adder 16. It will be appreciated by those in this technical field that the processor core 6 will typically contain many further circuit elements but these have been omitted for the sake of clarity.

An instruction decoder 18 serves to decode program instructions within a decode stage of an instruction pipeline 20 and to generate control signals which control the processing logic of the processor 6 to perform the desired processing operations. The configuration coprocessor 18 includes a programmable configuration register 22 storing a handler base pointer which serves to point to a memory location within the memory 4 which stores exception handling code, including null value exception handling code, or at least pointers thereto.

Figure 2:
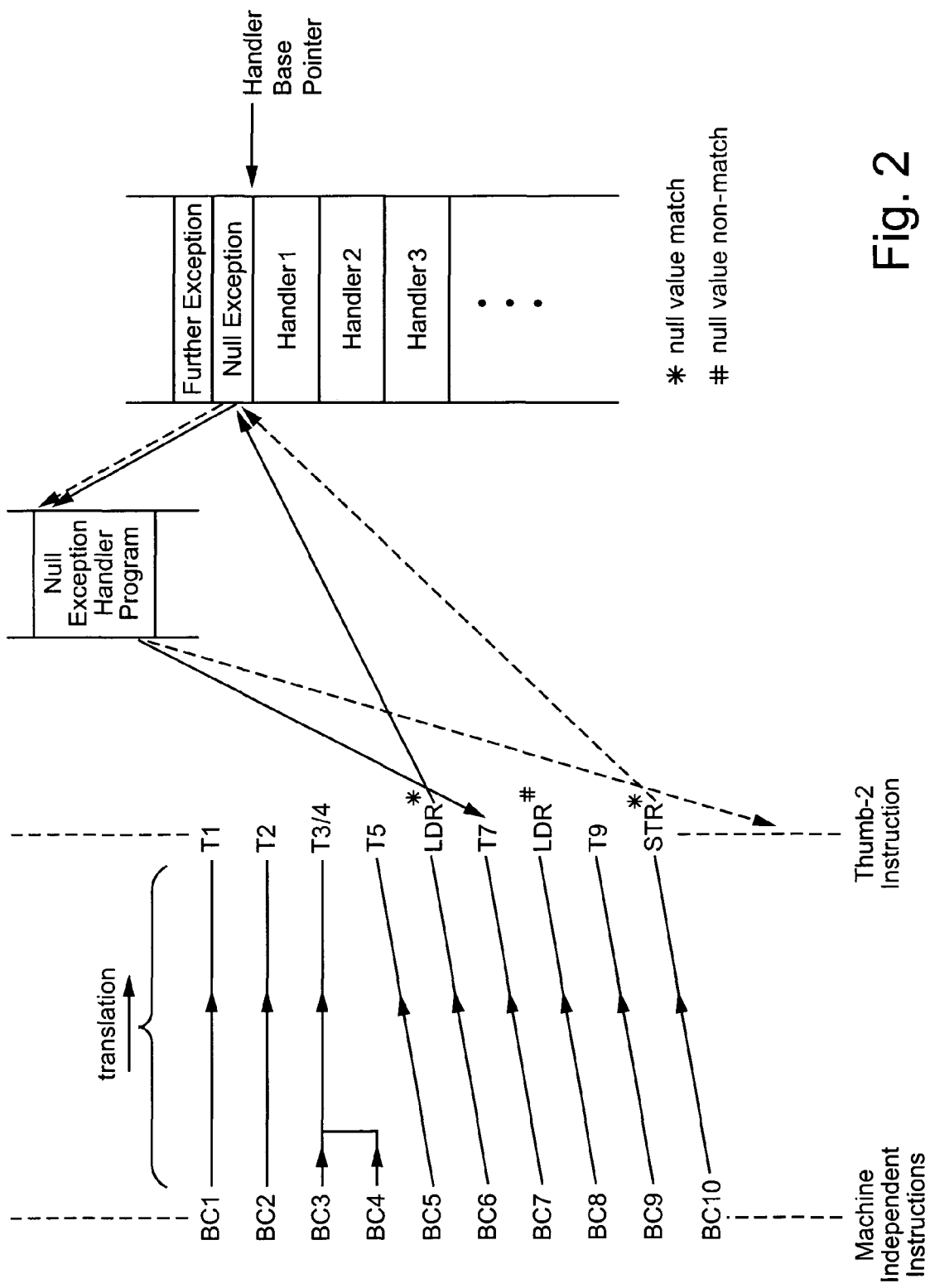
FIG. 2 schematically illustrates a translation of non-native program instructions to native program instructions, with those native program instructions being checked for null value exceptions.

FIG. 2 illustrates a stream of machine independent instructions BC1 to BC10 which are translated by a JIT compiler, or a dynamic adaptive translator, within a virtual machine to form a stream of native instructions which can be executed by the processor 6. As is illustrated, there may be a one-to-one, a one-to-many or a many-to-one mapping relationship. Some of the machine independent instructions are translated into memory access instructions, LDRs or STRs in this example assuming an ARM processor 6. These memory access instructions can potentially give rise to null value exceptions if they include a base register value a base register field pointing to a base register storing a null value. This null value may be "0" since it is often the case that normal emulated program execution will not legitimately access such a memory location (e.g. in the case of ARM processors that memory location is associated with hardware exception handling vectors and these would normally not be accessed by a program being emulated).

In the example of FIG. 2, the first LDR instruction does give rise to a null value exception, as does the later STR instruction. The second LDR instruction does not give rise to a null value exception. When a null value exception occurs, a branch is made to a memory location specified by an address held within the configuration coprocessor register subject to a fixed offset, in this case "−4". In this example, the instruction at that location is a jump instruction which directs processing to the start of the null exception handler program proper, which is stored elsewhere. When the null exception handler program has completed, a return is illustrated as being made to an instruction following that which gave rise to the null value exception. It will be appreciated that in many cases the return could be made to a different location, or indeed no return made at all. When the null value exception is detected, a link register within the register file 10 is loaded with a value corresponding to a potential return location within the native instruction stream. This return value may or may not be used as mentioned above.

Figure 3:
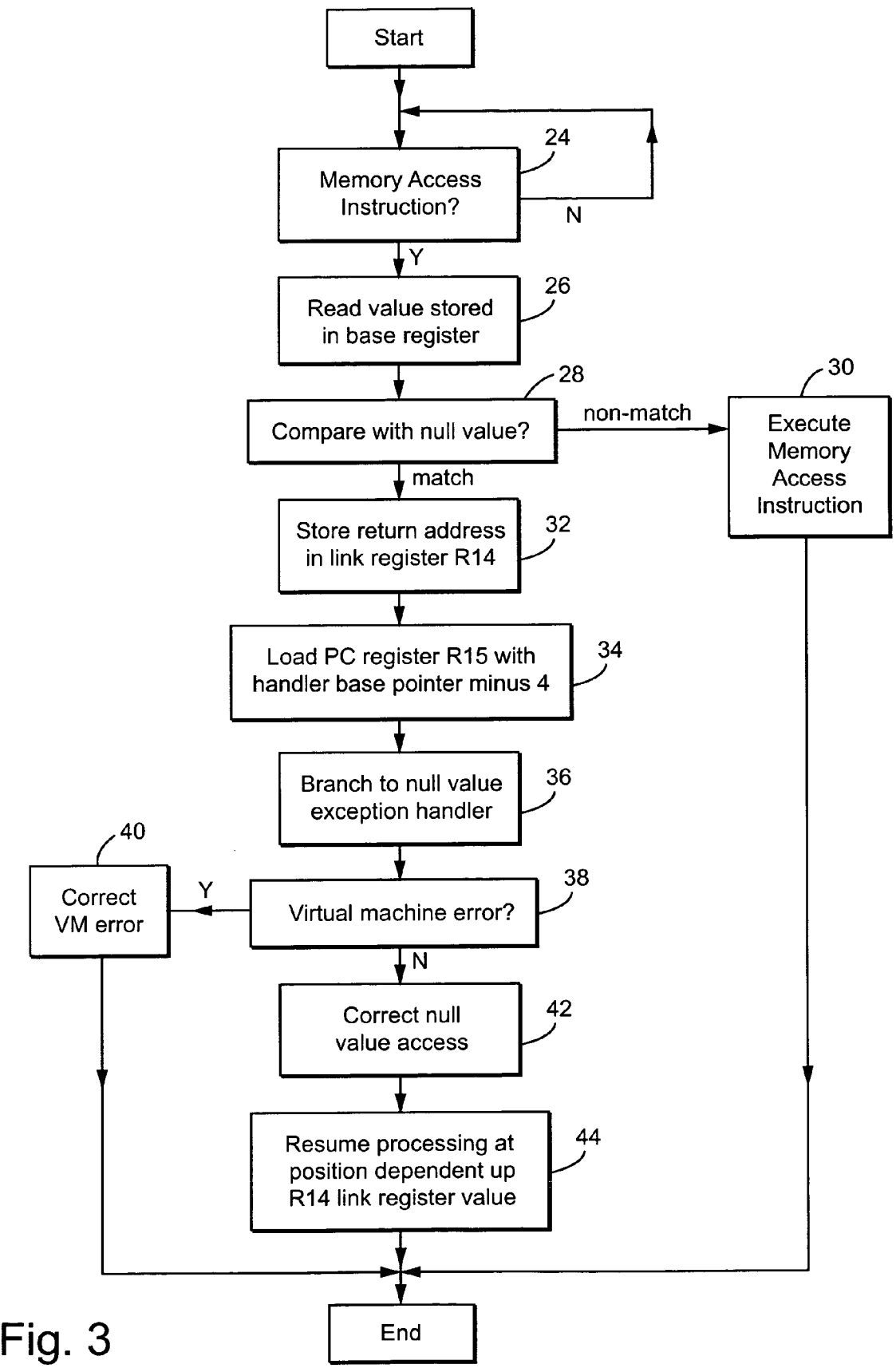
FIG. 3 is a flow diagram schematically illustrating processing operations which are controlled by an instruction decoder upon receipt of a memory access instruction.

FIG. 3 is a flow diagram illustrating the processing operations following a memory access instruction, at least some of which are controlled by the instruction decoder 18. At step 24, the instruction decoder 18 waits for receipt of a memory access instruction. (It will be appreciated that the instruction decoder 18 is also simultaneously responsive to native program instructions of many different other types.) When a memory access instruction is received, processing proceeds to step 26 at which the value stored within the base register is read. If this value, when subject to a comparison with a predetermined null value at step 28, results in a non-match with the null value, then the normal memory access instruction is executed at step 30 and the processing illustrated in FIG. 3 terminates.

However, if the processing at step 28 results in a match with the null value, then a null value exception needs to be initiated. At step 32 a return address is stored within a register R14 (although this may not be used as previously mentioned depending upon the nature of the null value exception handling employed). At step 34, the program counter register R15 within the register file 10 is loaded with a value obtained by reading the configuration coprocessor register 22 and subtracting a fixed offset of four from this. At step 36, a branch is then made either directly or indirectly to the null value exception handler utilising the program counter value loaded at step 34.

At step 38 the null value exception handler is run (the exception handling code is not normally considered as providing processing operations controlled by the instruction decoder 18 directly as a consequence of the memory access instruction currently being decoded). If step 38 detects a virtual machine error as having given rise to the null value exception, then step 40 serves to correct that error before the processing is resumed. If a virtual machine error is not detected, then step 42 serves to correct the null value access which has occurred due to incorrect programming within the non-native program being emulated. At step 44, processing of the emulated program is resumed at a position dependent upon (but not necessarily directly given by) the link register value starred in register R14 of the register file 10.

FIG. 4 schematically illustrates a possible encoding of load and store memory access instructions which may be subject to the null value checking operation described above.

Figure 5:
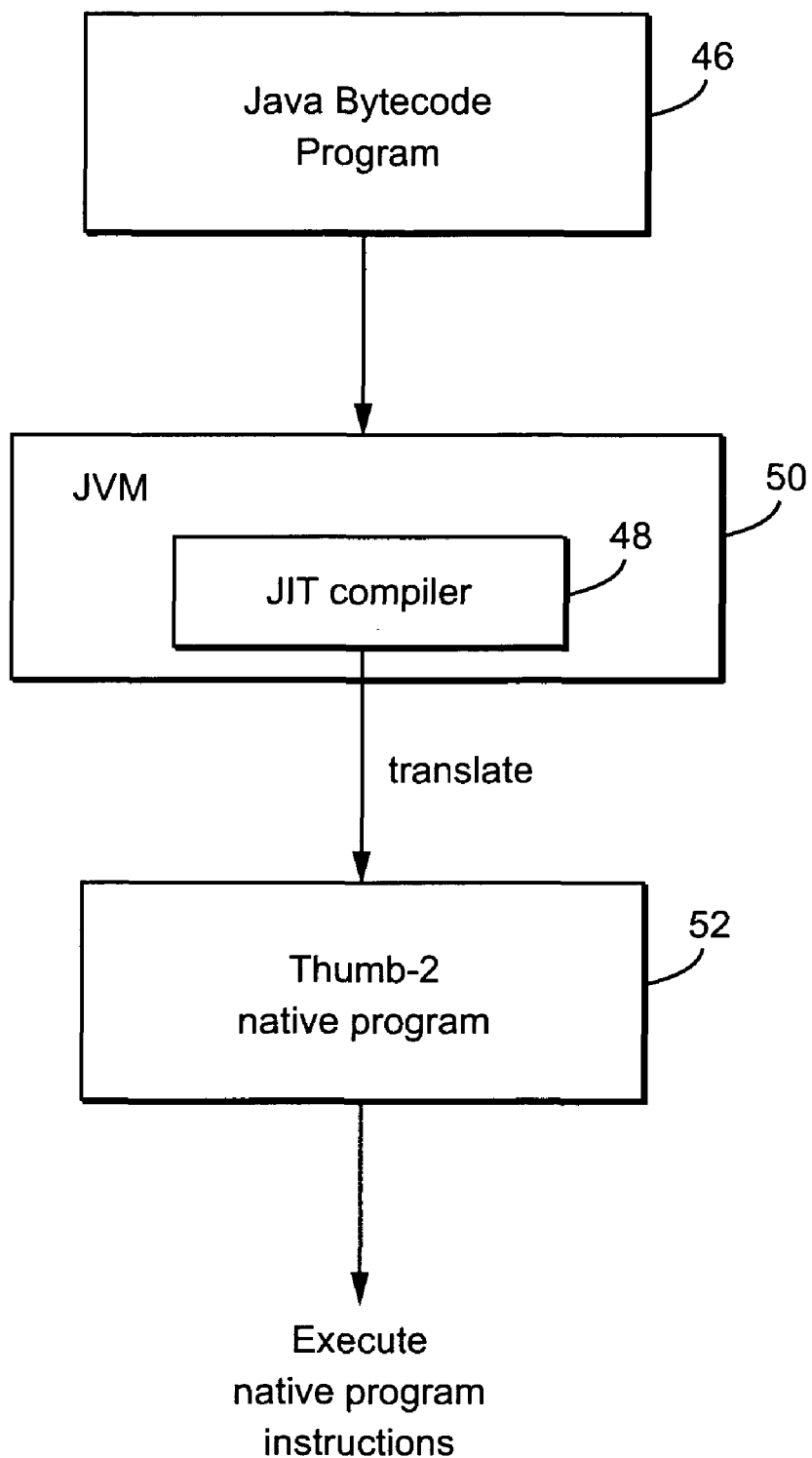
FIG. 5 schematically illustrates the relationship between a non-native program, a compiler translating that non-native program, a translated native program and the execution of that program.

FIG. 5 illustrates a Java bytecode program 46 which is translated by a JIT compiler 48 within a Java virtual machine 50 to form a translated native program 52 in the form of Thumb-2 native program instructions. These native program instructions include memory access instructions which are subject to the null value exception checking mechanisms described above. It will be appreciated that a native program 52 which contains these instructions which are subject to the null value checking, as well as a compiler or translator 48 which generates such instructions are all considered as aspects of the current technique. The native instruction program 52 is subsequently executed by the processor 6 to emulate the desired operation of the Java bytecode program 46. The non-native instructions may alternatively be MSIL bytecodes, CIL bytecodes or .NET bytecodes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for processing data comprising:
   processing logic operable to perform data processing operations; and
   an instruction decoder operable to decode program instructions to control said processing logic to perform data processing operations specified by said program instructions; wherein said instruction decoder, in response to a memory access instruction,
   compares a base register value, stored within a base register specified by a base register field of said memory access instruction, with a predetermined null value; and,
   if said base register value matches said predetermined null value, then said decoder triggers branching to execution of a null value exception handler.

2. An apparatus as claimed in claim 1, wherein in response to said memory access instruction a return address is stored pointing a memory location storing a program instruction to be executed upon a return from said null value exception handler.

3. An apparatus as claimed in claim 1, wherein said null value exception handler is located at a memory address pointed to by a value stored within a programmable configuration register.

4. An apparatus as claimed in claim 3, wherein said programmable configuration register is a coprocessor configuration register.

5. An apparatus as claimed in claim 3, wherein said branch is made to an instruction stored at a memory address given by said value stored within said programmable configuration register subject to a fixed offset.

6. An apparatus as claimed in claim 3, wherein said value stored within said programmable configuration register is a start address of said null value exception handler.

7. An apparatus as claimed in claim 3, wherein said value stored within said programmable configuration register is an address of a jump instruction operable to jump execution to a start address of said null value exception handler.

8. An apparatus as claimed in claim 1, wherein said null value exception handler is operable to determine if said memory access instruction attempting to access a location corresponding to a null value corresponds to emulation of a non-native program instruction that is not directly decodable by said instruction decoder attempting to make a memory access using a null value.

9. An apparatus as claimed in claim 8, wherein said non-native program instructions are machine independent program instructions.

10. An apparatus as claimed in claim 9, wherein said machine independent program instructions are one of:
    Java bytecodes;
    MSIL bytecodes;
    CIL bytecodes; and
    .NET bytecodes.

11. An apparatus as claimed in claim 8, wherein said non-native instructions are native program instructions of a different apparatus for processing data.

12. An apparatus as claimed in claim 11, wherein said processing logic and said instruction decoder are part of a RISC processor and said non-native instructions are native instructions of a CISC processor.

13. An apparatus as claimed in claim 1, wherein said null value exception handler is operable to determine if said memory access instruction attempting to access a location corresponding to a null value corresponds to an error in operation of a virtual machine computer program operable to translate non-native program instructions that are not directly decodable by said instruction decoder into native program instructions that are directly decodable by said instruction decoder.

14. An apparatus as claimed in claim 1, wherein said memory access instruction is a load instruction operable to load into a destination register specified by a destination register field within said load instruction a load value dependent upon a value read from a memory location specified by said base register value.

15. An apparatus as claimed in claim 1, wherein said memory access instruction is a store instruction operable to store into a memory location specified by said base register value a store value dependent upon source value stored within a source register specified by a source register field within said store instruction.

16. A method of processing data with an apparatus for processing data having processing logic operable to perform data processing operations and an instruction decoder operable to decode program instructions to control said processing logic to perform data processing operations specified by said program instructions, said method comprising the steps of:
in response to said memory access instruction decoded by said instruction decoder controlling said processing logic
comparing a base register value, stored within a base register specified by a base register field of said memory access instruction, with a predetermined null value; and
if said base register value matches said predetermined null value, then triggering branching to execution of a null value exception handler.

17. A method as claimed in claim 16, wherein in response to said memory access instruction a return address is stored pointing a memory location storing a program instruction to be executed upon a return from said null value exception handler.

18. A method as claimed in claim 16, wherein said null value exception handler is located at a memory address pointed to by a value stored within a programmable configuration register.

19. A method as claimed in claim 18, wherein said programmable configuration register is a coprocessor configuration register.

20. A method as claimed in claim 18, wherein said branch is made to an instruction stored at a memory address given by said value stored within said programmable configuration register subject to a fixed offset.

21. A method as claimed in claim 18, wherein said value stored within said programmable configuration register is a start address of said null value exception handler.

22. A method as claimed in claim 18, wherein said value stored within said programmable configuration register is an address of a jump instruction operable to jump execution to a start address of said null value exception handler.

23. A method as claimed in claim 16, wherein said null value exception handler is operable to determine if said memory access instruction attempting to access a location corresponding to a null value corresponds to emulation of a non-native program instruction that is not directly decodable by said instruction decoder attempting to make a memory access using a null value.

24. A method as claimed in claim 23, wherein said non-native program instructions are machine independent program instructions.

25. A method as claimed in claim 24, wherein said machine independent program instructions are one of:
Java bytecodes;
MSIL bytecodes;
CIL bytecodes; and
.NET bytecodes.

26. A method as claimed in claim 23, wherein said non-native instructions are native program instructions of a different apparatus for processing data.

27. A method as claimed in claim 26, wherein said processing logic and said instruction decoder are part of a RISC processor and said non-native instructions are native instructions of a CISC processor.

28. A method as claimed in claim 16, wherein said null value exception handler is operable to determine if said memory access instruction attempting to access a location corresponding to a null value corresponds to an error in operation of a virtual machine computer program operable to translate non-native program instructions that are not directly decodable by said instruction decoder into native program instructions that are directly decodable by said instruction decoder.

29. A method as claimed in claim 16, wherein said memory access instruction is a load instruction operable to load into a destination register specified by a destination register field within said load instruction a load value dependent upon a value read from a memory location specified by said base register value.

30. A method as claimed in claim 16, wherein said memory access instruction is a store instruction operable to store into a memory location specified by said base register value a store value dependent upon source value stored within a source register specified by a source register field within said store instruction.

31. A computer program product comprising a computer readable storage medium containing computer readable instructions for controlling an apparatus for processing data having processing logic operable to perform data processing operations and an instruction decoder operable to decode program instructions to control said processing logic to perform data processing operations specified by said program instructions, said computer program comprising,
in response to a memory access instruction decodable by said instruction decoder to control said processing logic
comparing a base register value, stored within a base register specified by a base register field of said memory access instruction, with a predetermined null value; and
if said base register value matches said predetermined null value, then branching to execution of a null value exception handler.

32. A computer program product as claimed in claim 31, wherein in response to said memory access instruction a return address is stored pointing a memory location storing a program instruction to be executed upon a return from said null value exception handler.

33. A computer program product as claimed in claim 31, wherein said null value exception handler is located at a memory address pointed to by a value stored within a programmable configuration register.

34. A computer program product as claimed in claim 33, wherein said programmable configuration register is a coprocessor configuration register.

35. A computer program product as claimed in claim 33, wherein said branch is made to an instruction stored at a memory address given by said value stored within said programmable configuration register subject to a fixed offset.

36. A computer program product as claimed in claim 33, wherein said value stored within said programmable configuration register is a start address of said null value exception handler.

37. A computer program product as claimed in claim 33, wherein said value stored within said programmable configuration register is an address of a jump instruction operable to jump execution to a start address of said null value exception handler.

38. A computer program product as claimed in claim 31, wherein said null value exception handler is operable to determine if said memory access instruction attempting to access a location corresponding to a null value corresponds to emulation of a non-native program instruction that is not directly decodable by said instruction decoder attempting to make a memory access using a null value.

39. A computer program product as claimed in claim 38, wherein said non-native program instructions are machine independent program instructions.

40. A computer program product as claimed in claim 39, wherein said machine independent program instructions are one of:
Java bytecodes;
MSIL bytecodes;
CIL bytecodes; and
.NET bytecodes.

41. A computer program product as claimed in claim 38, wherein said non-native instructions are native program instructions of a different apparatus for processing data.

42. A computer program product as claimed in claim 41, wherein said processing logic and said instruction decoder are part of a RISC processor and said non-native instructions are native instructions of a CISC processor.

43. A computer program product as claimed in claim 31, wherein said null value exception handler is operable to determine if said memory access instruction attempting to access a location corresponding to a null value corresponds to an error in operation of a virtual machine computer program operable to translate non-native program instructions that are not directly decodable by said instruction decoder into native program instructions that are directly decodable by said instruction decoder.

44. A computer program product as claimed in claim 31, wherein said memory access instruction is a load instruction operable to load into a destination register specified by a destination register field within said load instruction a load value dependent upon a value read from a memory location specified by said base register value.

45. A computer program product as claimed in claim 31, wherein said memory access instruction is a store instruction operable to store into a memory location specified by said base register value a store value dependent upon source value stored within a source register specified by a source register field within said store instruction.

46. A computer program product comprising a computer readable storage medium containing computer readable instructions for translating non-native program instructions to form native program instructions directly decodable by an apparatus for processing data having processing logic operable to perform data processing operations and an instruction decoder operable to decode program instructions to control said processing logic to perform data processing operations specified by said program instructions, said native program instructions comprising:
in response to a memory access instruction decodable by said instruction decoder to control said processing logic comparing a base register value, stored within a base register specified by a base register field of said memory access instruction, with a predetermined null value; and
if said base register value matches said predetermined null value, then triggering branching to execution of a null value exception handler.

47. A computer program product as claimed in claim 46, wherein in response to said memory access instruction a return address is stored pointing a memory location storing a program instruction to be executed upon a return from said null value exception handler.

48. A computer program product as claimed in claim 46, wherein said null value exception handler is located at a memory address pointed to by a value stored within a programmable configuration register.

49. A computer program product as claimed in claim 48, wherein said programmable configuration register is a coprocessor configuration register.

50. A computer program product as claimed in claim 48, wherein said branch is made to an instruction stored at a memory address given by said value stored within said programmable configuration register subject to a fixed offset.

51. A computer program product as claimed in claim 48, wherein said value stored within said programmable configuration register is a start address of said null value exception handler.

52. A computer program product as claimed in claim 48, wherein said value stored within said programmable configuration register is an address of a jump instruction operable to jump execution to a start address of said null value exception handler.

53. A computer program product as claimed in claim 46, wherein said null value exception handler is operable to determine if said memory access instruction attempting to access a location corresponding to a null value corresponds to emulation of a non-native program instruction that is not directly decodable by said instruction decoder attempting to make a memory access using a null value.

54. A computer program product as claimed in claim 53, wherein said non-native program instructions are machine independent program instructions.

55. A computer program product as claimed in claim 54, wherein said machine independent program instructions are one of:
Java bytecodes;
MSIL bytecodes;
CIL bytecodes; and
.NET bytecodes.

56. A computer program product as claimed in claim 53, wherein said non-native instructions are native program instructions of a different apparatus for processing data.

57. A computer program product as claimed in claim 56, wherein said processing logic and said instruction decoder are part of a RISC processor and said non-native instructions are native instructions of a CISC processor.

58. A computer program product as claimed in claim 46, wherein said null value exception handler is operable to determine if said memory access instruction attempting to access a location corresponding to a null value corresponds to an error in operation of a virtual machine computer program operable to translate non-native program instructions that are not directly decodable by said instruction decoder into native program instructions that are directly decodable by said instruction decoder.

59. A computer program product as claimed in claim 46, wherein said memory access instruction is a load instruction operable to load into a destination register specified by a destination register field within said load instruction a load value dependent upon a value read from a memory location specified by said base register value.

60. A computer program product as claimed in claim 46, wherein said memory access instruction is a store instruction operable to store into a memory location specified by said base register value a store value dependent upon source value stored within a source register specified by a source register field within said store instruction.

* * * * *